(12) United States Patent
Schmidt et al.

(10) Patent No.: US 8,109,070 B1
(45) Date of Patent: Feb. 7, 2012

(54) DUAL WINDROW CROP INVERTING AND COMBINING APPARATUS AND METHOD

(75) Inventors: Eugene H. Schmidt, Madrid, NE (US); Lawrence E. Kuhlmann, North Platte, NE (US)

(73) Assignee: A.I.L., Inc., North Platte, NE (US)

( * ) Notice: Subject to any disclaimer, the term of this patent is extended or adjusted under 35 U.S.C. 154(b) by 0 days.

(21) Appl. No.: 12/847,347

(22) Filed: Jul. 30, 2010

(51) Int. Cl.
*A01D 84/00* (2006.01)
(52) U.S. Cl. .......................................................... 56/370
(58) Field of Classification Search ............. 56/365–374
See application file for complete search history.

(56) References Cited

U.S. PATENT DOCUMENTS

| | | | | |
|---|---|---|---|---|
| 3,221,484 A | * | 12/1965 | Van Der Lely | 56/370 |
| 3,496,713 A | * | 2/1970 | Reinhardt et al. | 56/370 |
| 5,272,860 A | * | 12/1993 | Baril et al. | 56/366 |
| 6,354,429 B2 | * | 3/2002 | Kuhlmann et al. | 198/510.1 |
| 7,418,811 B2 | * | 9/2008 | Hironimus et al. | 56/354 |

* cited by examiner

*Primary Examiner* — Thomas Will
*Assistant Examiner* — Mai Nguyen
(74) *Attorney, Agent, or Firm* — Greer, Burns & Crain, Ltd.

(57) ABSTRACT

Embodiments of the invention are directed to apparatus for selectively inverting one or more windrows of crop material on the ground as the apparatus is moved in a forward direction, each of the windrows having a lower surface and a generally defined width, the apparatus comprising, a frame for attachment to a vehicle, a first transport mechanism for picking up the crop material of a windrow, moving the crop material in a rearward direction, turning the crop material through a generally horizontal arc and depositing the turned crop material in an inverted condition, the first transport mechanism being movable between a raised non-operating position and a lowered operating position, a second transport mechanism having substantially the same structure and functionality as the first transport mechanism, and a hydraulic control system selectively moving the transport mechanisms between the raised and lowered positions and for driving the transport mechanisms.

20 Claims, 5 Drawing Sheets

DUAL WINDROW CROP INVERTING AND COMBINING APPARATUS AND METHOD

BACKGROUND OF THE INVENTION

The present invention generally relates to apparatus and a method for handling crop material such as hay, alfalfa and similar crops that are harvested throughout the world.

It has been common practice for decades that hay crop material is harvested by mowing and then raking the cut hay into strips of material known as windrows. More recently, the mowing and raking of hay is done with a single implement that combines these two activities in one operation.

The process of moving newly mown hay into a windrow and placing it on moist ground presents a problem of drying and curing the hay, particularly on the underside of the windrow. While the top side of the windrow may dry out in a relatively few hours, depending upon the weather, the underside often takes much more time to dry because air and sunlight does not reach this lower level of hay. It is a problem that is amplified with heavy hay, particularly if the windrow has gotten wet. In these conditions, the hay must be moved and the underside turned over to allow of the windrow to dry and cure.

In recent times, most of these moving and turning operations are performed by side delivery rakes that are used in the same way as those used to initially move the mowed hay into a windrow. While those rakes were considered to be advancements over what are known as dump rakes, such side delivery rakes have distinct disadvantages when they are used to invert as well as merge adjacent windrows into a single windrow. This is due to the fact that their operation tends to destroy the integrity and structure of the windrow as well as cause undesirable leaf loss of the hay plants.

It is highly desirable to efficiently and reliably invert windrows without destroying the integrity of the windrow which thereby minimizes the loss of leaves from the plants.

SUMMARY OF THE INVENTION

Embodiments of the invention are directed to apparatus for selectively inverting one or more windrows of crop material on the ground as the apparatus is moved in a forward direction, each of the windrows having a lower surface and a generally defined width, the apparatus comprising, a frame for attachment to a vehicle, a first transport mechanism for picking up the crop material of a windrow from the ground at an entrance position, moving the crop material in a rearward direction, turning the crop material through a first generally horizontal arc at least greater than about 90 degrees, and depositing the turned crop material from an elevated exit position onto the ground in an inverted condition, the first transport mechanism being mounted to the frame and being movable between a raised non-operating position and a lowered operating position, a second transport mechanism for picking up the crop material of a windrow from the ground at an entrance position, moving the crop material in a rearward direction, turning the crop material through a first generally horizontal arc at least greater than about 90 degrees, and depositing the turned crop material from an elevated exit position onto the ground in an inverted condition, the second transport mechanism being mounted to the frame and being movable between a raised non-operating position and a lowered operating position, and a hydraulic control system configured to be connected to a hydraulic power source for selectively moving the first and second transport mechanisms between the raised and lowered positions and for driving the first and second transport mechanisms.

DETAILED DESCRIPTION

Embodiments of the present invention are directed to apparatus and a method for manipulating crop material of the type such as alfalfa, hay and other plants which are used for feed for animals as well as for many other purposes. Such hay crops are harvested by mowing and generally simultaneously or subsequently manipulated into windrows which extend generally parallel to one another. They may be formed in straight lines extending from one end of a field to another or they may be curved depending upon the size, shape and contours of the land where the crop is located.

The distance between adjacent windrows is generally a function of the windrow producing implement that is used to make them and currently such windrow producing implements have an operating width so that the center to center distance between adjacent windrows is generally between 14 feet to 18 feet. The apparatus of the present invention can efficiently operate at these spacing distances, but can also be scaled to accommodate windrow spacing that is smaller than 14 feet and larger than 18 feet if desired.

Embodiments of the present invention are configured to have a pair of transport mechanisms which are spaced apart from one another and which are configured to selectively engage the row crop material of a windrow and invert it while being moved through a field containing the windrows. Each of the transport mechanisms is configured to be pivoted between an upper non-operating position and a lowered operating position depending upon the function that is being carried out. In this regard, each of the transport mechanisms is configured to engage and invert a single windrow at a time and they are also configured to engage two windrows at a time and combine them into a single windrow.

Embodiments of the apparatus are configured to have a forward tongue that is connected to a tractor hitch so that a tractor can pull the apparatus through the field. Other embodiments can be configured to be attached to a 3-point hitch of a tractor. In the event that such a 3-point hitch is employed, it may eliminate the need for the apparatus to have wheels, whereas the embodiment having the hitch would be carried by wheels on a frame as it is pulled through a field.

Each of the transport mechanisms includes a pair of closed or endless belts which engage the windrow crop material and convey it upwardly where it is rotated through a horizontal arc and then deposited on the ground in an inverted position. The speed of the belts is controllable to match the speed of the tractor so that the windrow is not appreciably attenuated or compressed which contributes to maintaining the structural integrity of the windrow so that it is gently lifted, turned and deposited without additional manipulation which could contribute to the loss of leaves.

Importantly, when it is deposited in this manner, the top portion of the windrow is deposited on the ground and the generally wetter bottom portion is then placed on the top of the windrow. Also importantly, the windrow that has been manipulated is deposited on dry ground because it is translated to the side of the location of the line of the original windrow. Since it is deposited on ground exposed to the sun and is therefore drier, rather than wet ground, the moisture from the ground does not rewet the dryer portion of the inverted windrow, all of which contributes to the quick drying of the whole content of the windrow. It has been found that windrows inverted in this manner tend to be dry enough within three or four hours and can be bailed or otherwise processed without undue delay.

The amount of jostling and side forces that is subjected to the windrow during the inversion process is minimal compared to that which is produced by conventional side rakes that impact and throw the windrow to its new position. The inversion process is constant and reliable compared to all other known ways in which windrows are attempted to be inverted.

Figure 1:
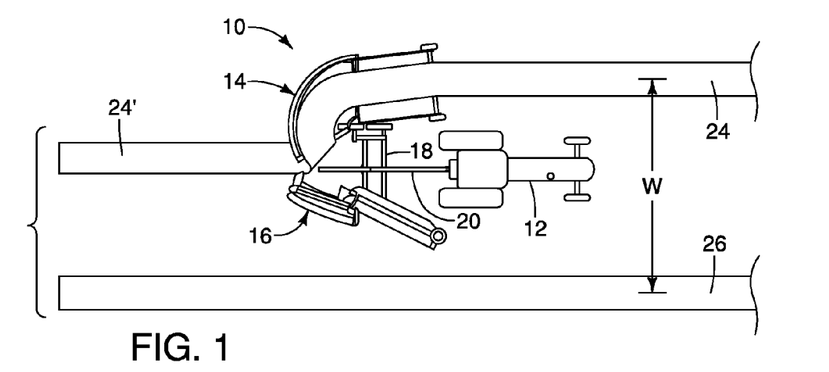
FIG. 1 is a greatly simplified top view of a preferred embodiment of a crop material windrow inverting apparatus that is connected to a tractor moving along a windrow of crop material and illustrating the inversion of the crop material while the tractor moves forwardly through a field.
Figure 2:
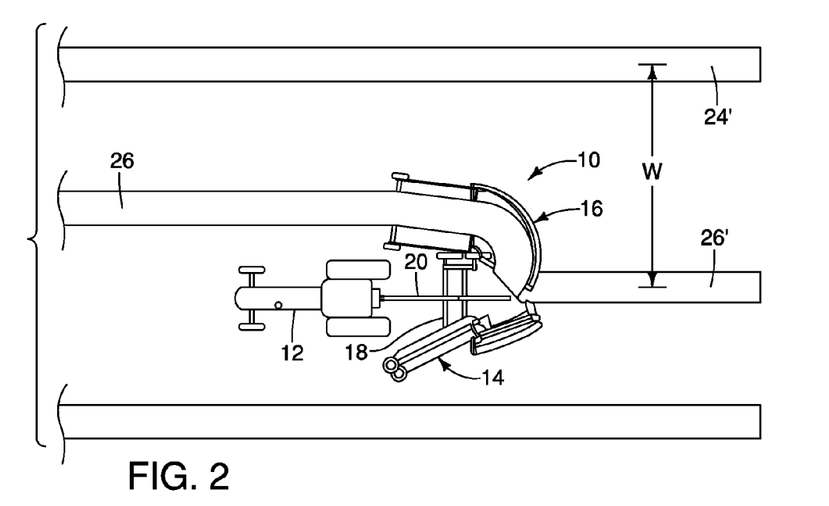
FIG. 2 is another view similar to FIG. 1, showing the apparatus inverting the adjacent windrow while traversing in the opposite direction relative to the direction shown in FIG. 1.
Figure 3:
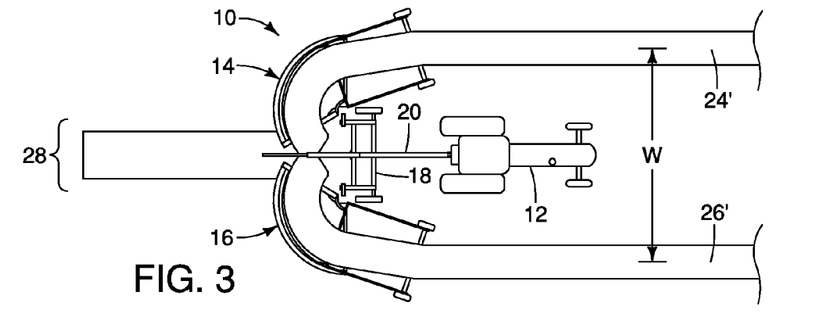
FIG. 3 is another view similar to FIG. 1 showing the apparatus combining two adjacent windrows into a single windrow.
Figure 4:
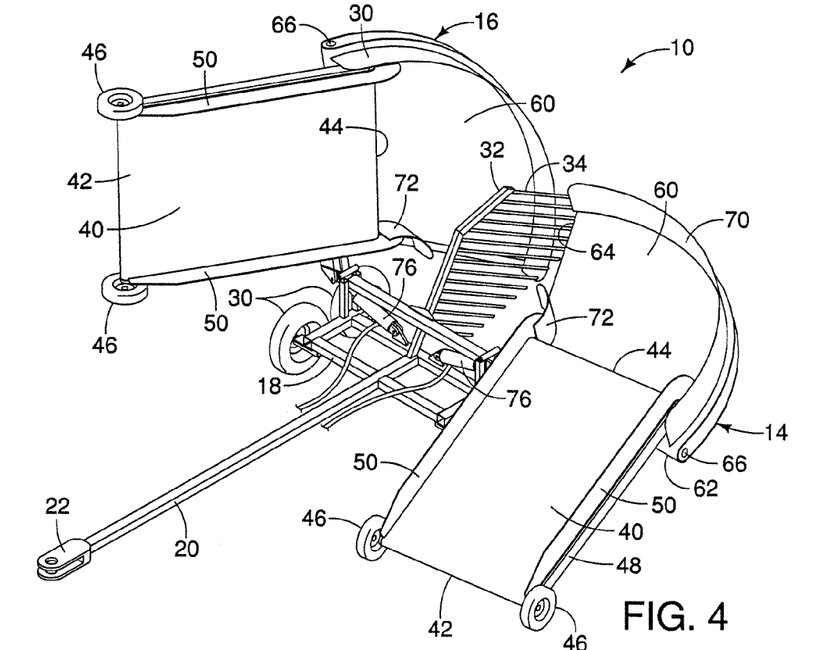
FIG. 4 is a left front perspective view of the apparatus shown in FIG. 1, showing left and right transport mechanisms, with the right transport mechanism shown in a nonfunctioning elevated position and the left transport mechanism shown in its lowered operating position.

Turning now to the drawings and particularly FIGS. 1-3, the apparatus, indicated generally at 10, is shown being drawn by a tractor 12. The apparatus includes a left transport mechanism, indicated generally at 14, and a right transport mechanism, indicated generally at 16, which are mounted to a frame 18 from which a tongue 20 extends forwardly and has a hitch 22 (see FIGS. 4 and 5) that is attached to the rear of the tractor 12. Each of the transport mechanisms 14 and 16 can be lowered into an operating position and raised to a non-operating position by the operator of the tractor manipulating hydraulic controls.

As shown in FIG. 1, the tractor is moving to the right in a field having two windrows 24 and 26 that have a width W between center lines of the adjacent parallel windrows. The left transport mechanism 14 engages the windrow and moves it to the right to the location occupied by the segment 24'. When the tractor reaches the end of the windrow, it turns around and raises the left transport mechanism 14 while lowering the right transport mechanism 16 to engage the windrow 26 which it moves to the left leaving the segment 26'. The difference between the windrows 24' and 26 as shown in FIG. 1 is less than the width W, but after it the windrow 26 has been inverted, the distance between the inverted windrow 24' and 26' again has the desired width W.

After the windrows have been inverted, it is desirable to combine windrows so that they are able to be bailed, both of the transport mechanisms 14 and 16 are lowered into operating position and engage the windrows 24' and 26' to combine them into windrow 28.

From this discussion, it should be understood that by manipulating the transport mechanisms between their non-operating and operating positions and traversing the fields back and forth, the apparatus of the present invention efficiently inverts each windrow without interference. Combining adjacent windrows into a single windrow is also easily achieved. In this regard, when they are combined, the top portion of each windrow meets the other of the combined windrows which further facilitates drying of the crop material prior to being bailed or formed into large wheels of hay and the like.

The frame 18 is preferably fabricated from square steel tube stock of suitable dimension to support the transport mechanisms 14 and 16 welded together, although other shapes of steel can be used. There are four wheels 30 are mounted to the frame for supporting the apparatus. The frame 18 also has a generally vertical barrier 32 made of solid sheet material or a plurality of rods 34 which retain the crop material that is dropped off of the transport mechanisms 14 and 16. Other embodiments of the present invention may not include such a barrier 32.

With regard to the transport mechanisms 14 and 16, they have substantially the same construction except that the two mechanisms are symmetrical to one another. For this reason, the same reference numbers are used for both transport mechanisms. The transport mechanism 14, 16 have a straight endless movable belt 40 that is inclined upwardly, has an entrance end 42 and an exit end 44 which include rotatable shafts (not shown) journaled in a belt support structure 48. It is preferred that the shaft on the upper exit end 44 be driven by a hydraulic motor (not shown) that is preferably driven by a hydraulic source which is also preferably part of the tractor to which the apparatus is used with.

The entrance end portion 42 has a pair of wheels 46 which are shown to be attached to the belt support structure 48 that also houses the shafts, with the wheels being sized so that the bottom reach of the entrance end 42 is spaced a few inches, i.e., 3" to 6", from the ground. While the embodiments shown have the wheel with their axles fixed, other embodiments may include a caster mounting so that the straight belt 40 can be splayed outwardly by a small degree as shown in FIGS. 1-3, which may or may not be adjustable to accommodate different width spacing between adjacent windrows.

Side retaining walls 50 are provided to guide the crop material and inhibit it from falling off of the belt 40. The upper exit end 44 drops the material onto a second closed end conveyor belt 60 which is curved between 90° and 130°, but preferably about 120° between its entrance end 62 and exit end 64. The second belt 60 is driven by a shaft 66 and turns around its exit end 64. The exit end 64 of the curved belts 60 are directed toward one another and are relatively close to the center barrier 32 when the transport mechanisms are in their lowered operating position. The 120 degree arc is sufficient to direct the crop material so that it is completely inverted during operation, but not far enough so that there is any interference of one transport mechanism relative to the other.

Figure 5:
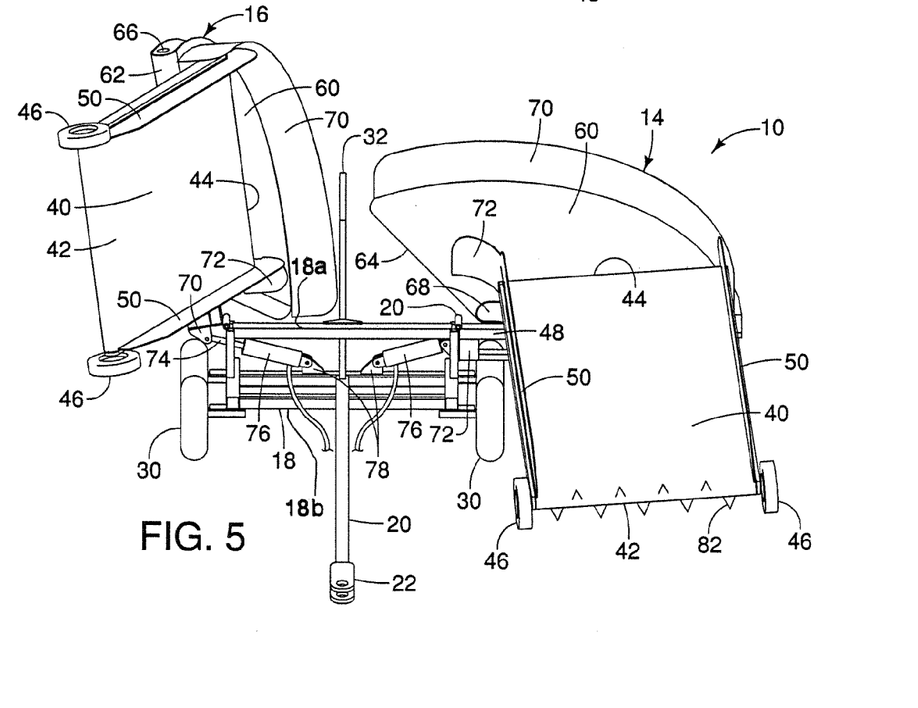
FIG. 5 is a front view of the apparatus shown in FIG. 4.
Figure 6:
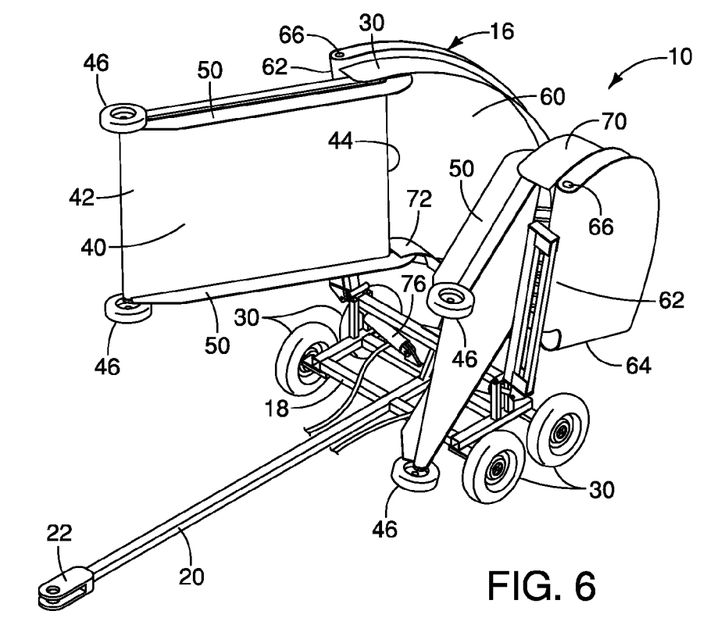
FIG. 6 is a left front perspective view of the apparatus shown in FIG. 4, with both left and right transport mechanisms being shown in the elevated nonfunctional position.
Figure 7:
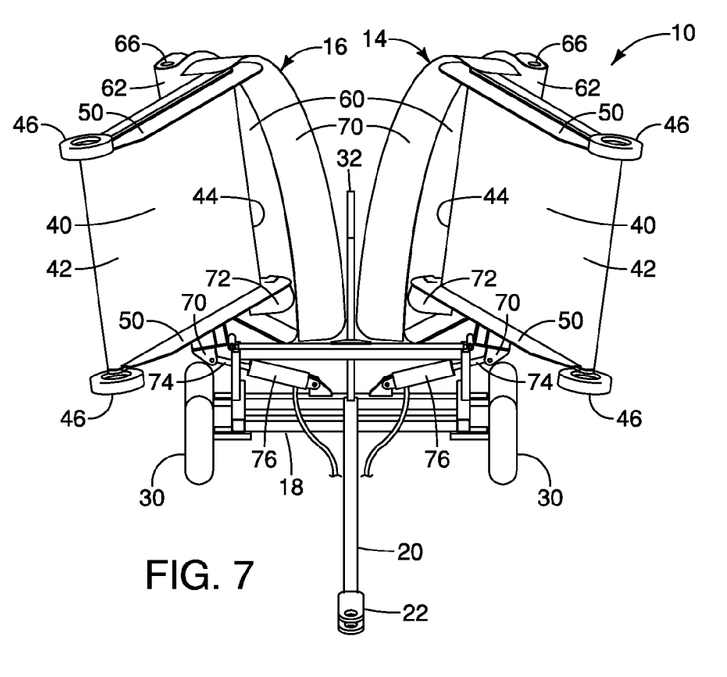
FIG. 7 is a front view of the apparatus shown in FIG. 6.
Figure 8:
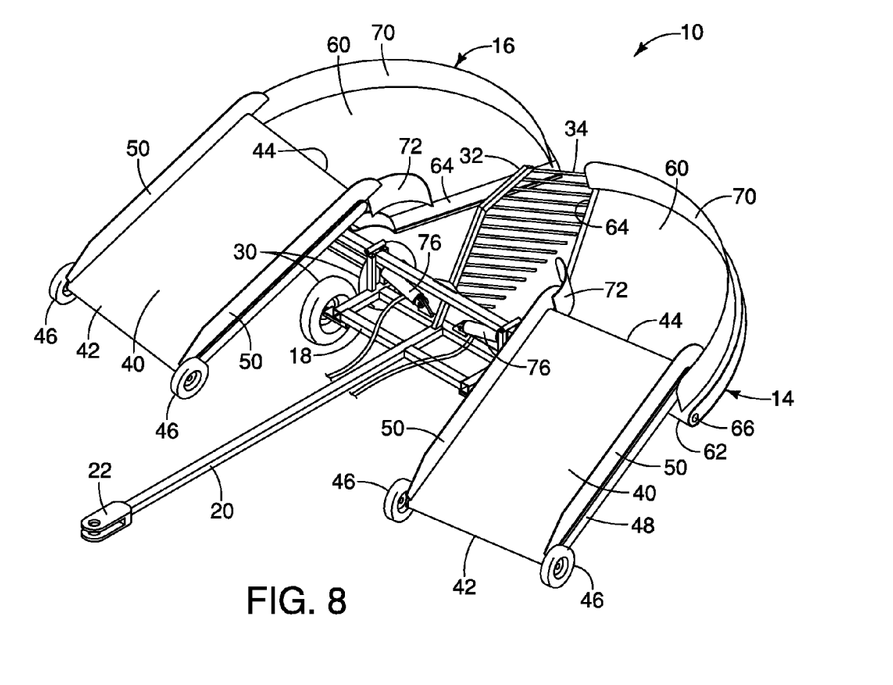
FIG. 8 is a left front perspective view of the apparatus shown in FIG. 4, illustrating both left and right transport mechanisms in their lowered operative position.
Figure 9:
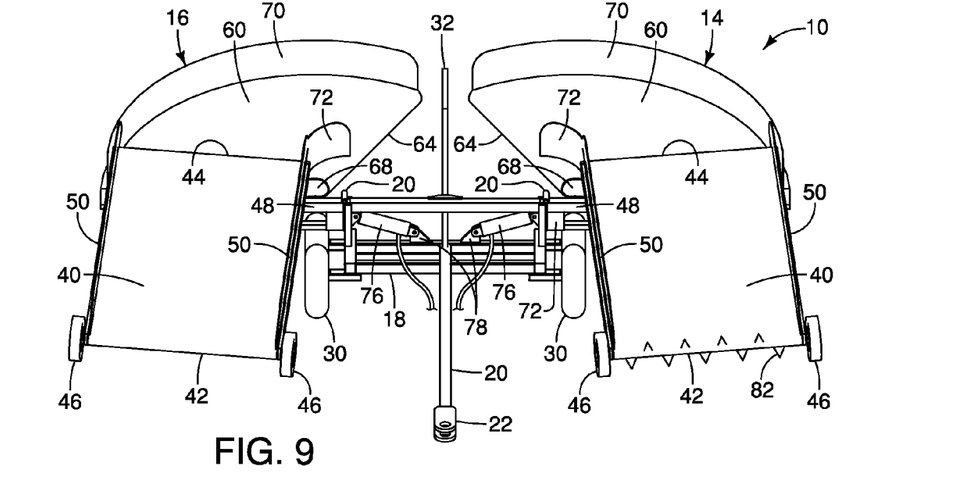
FIG. 9 is a front view of the apparatus shown in FIG. 8.

The belt support structure 48 carries both belts 40 and 60 and as shown in FIG. 5, the belt support structure 48 is pivotally connected to the frame 18 by a hinge 70 so that the transport mechanisms 14 and 16 can be pivoted between their raised, non-operating position and the lowered operating position. The belt support structure 48 also has a lower extension 72 which provides a connection point for the transport mechanisms and a rod 74 of a hydraulic cylinder 76 that is connected to a flange 78 that is a part of the frame 18. When the rod is extended, it raises the associated transport mechanism, such as shown for the right transport mechanism 16 in FIG. 5, for example. As seen in FIG. 5, the hydraulic cylinders 76 are mounted to the frame 18 between an upper member 18a and a lower member 18b of the frame to be below the respective transport mechanisms 14, 16, when the mechanism is raised to the non-operating position. In the non-operating positions, the transport mechanisms are disposed above the cylinders 76.

The belt 40 preferably has a number of tongues or extensions 82 located at spaced positions throughout its surface area for engaging the crop material to initially engage the crop material and convey it up the belt 40. These extensions are preferably made of plastic or other material that is resiliently connected to the belt in a manner whereby they contact the crop material and pull it upwardly. In this regard, they preferably have a length that nearly reaches the ground and the length is therefore at least partly determined by the diameter of the wheels 46 as is shown in FIG. 5.

Figure 10:
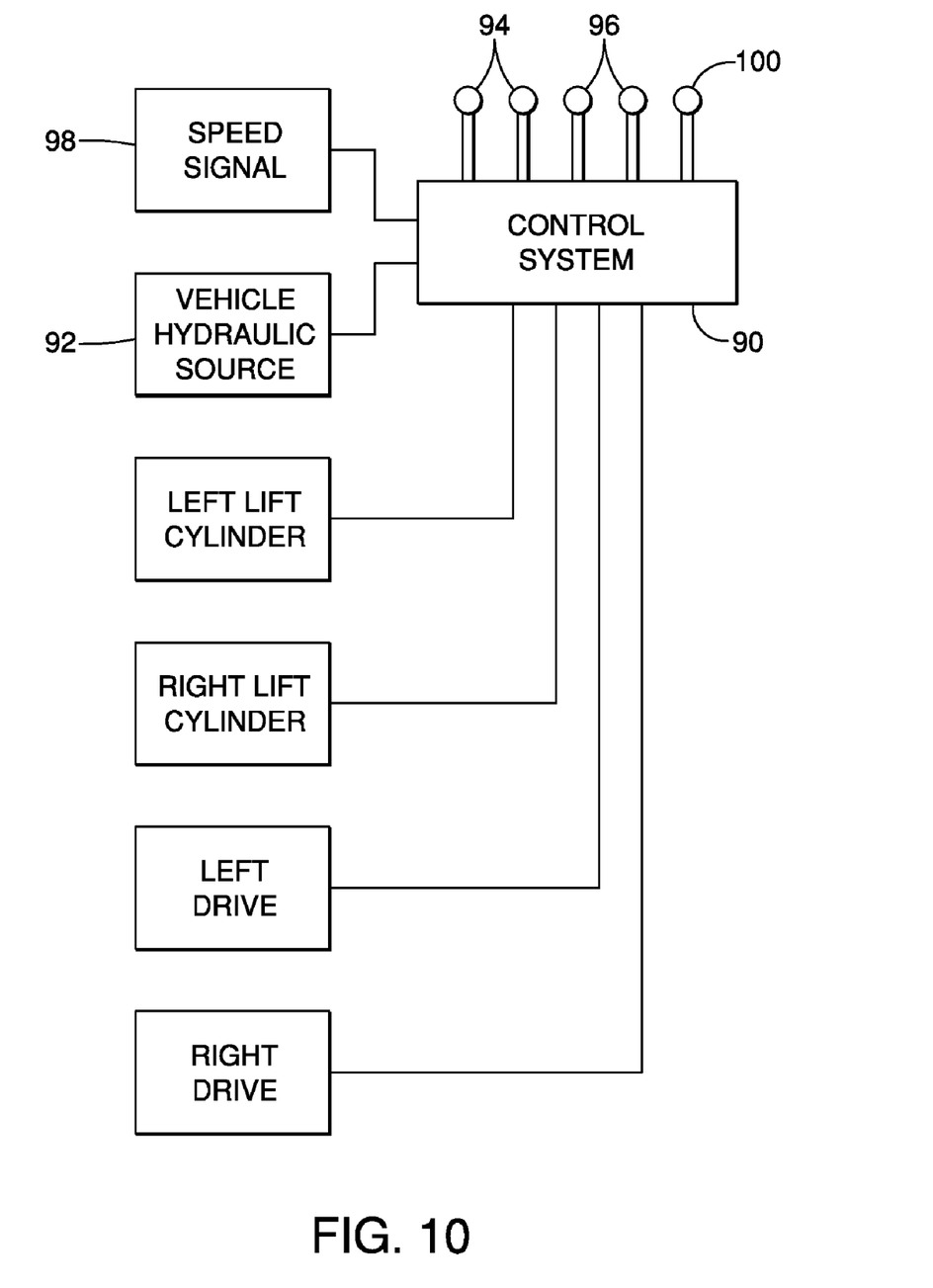
FIG. 10 is a block diagram of the hydraulic system for controlling the operation of the apparatus shown in FIGS. 1-9.

With regard to the operation of the apparatus, and referring to FIG. 10, the apparatus is controlled by a control system 90 which may be configured to be located in the cab of a tractor in which the apparatus is used with, and it is preferably connected to a hydraulic source 92 that is part of the tractor. The control system 90 may include operating handles 94 for controlling the left and right lifting cylinders and handles 96 for controlling the operation of the left and right drive motors. In this regard, it is preferred that both drive motors for the belts 40 and 60 be simultaneously activated and deactivated. A speed signal 98 may be input to the control system 90 and the left and right drive motors maybe automatically adjusted to correspond to the speed of the tractor in which they are pulled. This is desirable so that the belts 40 and 60 engage and convey the crop material of the windrow so as to not attenuate or compress the crop material during operation. It is therefore highly desirable to have the speed of the belts 40 and 60 correspond to the ground speed of the tractor 12 and most tractors generate such a speed indicating signal. Alternatively, a speed detector could be placed on one of the wheels 30 of the apparatus itself. Alternatively, the control system may have a handle 100 that enables an operator to manually adjust the speed of the left and right drive motors in the event that a speed signal is not present or some adjustment is necessary relative to a speed signal that is being received.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. An apparatus for selectively inverting one or more windrows of crop material on the ground as said apparatus is moved in a forward direction through a field, each of the windrows having a lower surface and a generally defined width, said apparatus comprising:
   a frame for attachment to a vehicle;
   a first transport mechanism for picking up the crop material of a windrow from the ground at an entrance position, moving the crop material in a rearward direction, turning the crop material through a first arc of between 90 and 130 degrees between an entrance end and an exit end of a closed conveyor belt, and depositing said turned crop material from an elevated exit position onto the ground in an inverted condition, said first transport mechanism being mounted to said frame and being movable during operation in the field between a raised non-crop material engaging position and a lowered crop material engaging position;
   a second transport mechanism for picking up the crop material of a windrow from the ground at an entrance position, moving the crop material in a rearward direction, turning the crop material through a first arc of between 90 and 130 degrees between an entrance end and an exit end of a closed conveyor belt, and depositing said turned crop material from an elevated exit position onto the ground in an inverted condition, said second transport mechanism being mounted to said frame and being movable during operation in the field between a raised non-crop material engaging position and a lowered crop material engaging position, said arcs being dimensioned for directing the crop material so that it is completely inverted as it passes said exit position for maintaining an integrity of the crop material as it is inverted, and also accommodating said movement of said adjacent first and second transport mechanisms;
   said first and second transport mechanisms being configured such that when both are in said respective lowered crop material engaging positions, said corresponding exit ends each define an acute angle with a direction of travel when viewed from above; and
   a hydraulic control system configured to be connected to a hydraulic power source for selectively moving said first and second transport mechanisms between said raised and lowered positions and for selectively driving each of said first and second transport mechanisms to perform said picking up, moving, turning and depositing of the crop material when in said lowered position.

2. Apparatus as defined in claim 1 wherein said first and second transport mechanisms are pivotably mounted to said frame.

3. Apparatus as defined in claim 1 wherein said first and second transport mechanisms are spaced apart from one another and said first and second arcs are directed toward one another.

4. Apparatus as defined in claim 3 wherein said entrance positions of said first and second transport mechanisms are spaced apart a predetermined distance that corresponds to the distance between centers of adjacent windrows that are within the range of about 14 to about 18 feet.

5. Apparatus as defined in claim 3 wherein said exit positions of said first and second transport mechanisms are closely adjacent one another when said first and second transport mechanisms are at least in their lowered crop engaging positions.

6. Apparatus as defined in claim 1 wherein at least one of said first and second transport mechanisms comprises:
   a first movable closed conveyor belt mounted on rotatable shafts at opposite ends, said first belt having said entrance position at a forward reach thereof and extending upwardly and rearwardly to said exit position;
   a second movable closed conveyor belt mounted on rotatable shafts at opposite ends thereof, said second belt having an arcuate path with an entrance position adjacent said first belt exit position and an exit position corresponding to said elevated exit position;
   said first and second movable closed conveyor belts together positively engage, pick up, move, turn and deposit the crop material during operation.

7. Apparatus as defined in claim 1 wherein said hydraulic control system comprises a control module, a hydraulic drive motor operatively connected to each of said first and second transport mechanisms, said drive motor being connected to said hydraulic power source and controlled by said control module, said control module being configured to control the speed of operation of each of said transport mechanisms.

8. Apparatus as defined in claim 1 further comprising a hydraulic device for selectively moving each of said first and second transport mechanisms between said raised non-engaging position and said lowered engaging position,
   wherein each of said hydraulic devices comprises a hydraulic cylinder having an extendable and retractable rod, one of said cylinder and rod being mounted to said frame and the other of said cylinder and rod being mounted to one of said transport mechanisms, wherein each said hydraulic cylinder is mounted on said frame so that said transport mechanism in said raised position is located above said cylinder.

9. Apparatus as defined in claim 8 wherein said hydraulic control system is configured to operate said cylinders to selectively raise and lower each of said transport mechanisms.

10. Apparatus as defined in claim 6 wherein said apparatus is configured to be pulled by a vehicle having a hydraulic power source and a vehicle speed indicating signal, said hydraulic control system being configured to input the speed indicating signal and control the speed of operation of said first and second conveyor belts to correspond to said vehicle speed for enhancing the maintenance of the integrity of the windrow during the moving, turning and depositing of the crop material.

11. Apparatus as defined in claim 6 wherein each of said transport mechanisms have a curved retaining wall adjacent to an outer edge of said second movable closed conveyor belt for guiding crop material to said exit position.

12. Apparatus as defined in claim 6 wherein said apparatus further comprises a vertical barrier between the exit positions of said second conveyor belts, said barrier being mounted to said frame.

13. Apparatus as defined in claim 1 wherein said arc is within the range of greater than 90 degrees to about 145 degrees.

14. Apparatus as defined in claim 1 wherein said frame has wheels and a tongue portion for attachment to the vehicle.

15. A method for selectively inverting and combining a plurality of windrows of crop material that extend generally parallel to one another in a crop field using an apparatus having left and right spaced apart transport mechanisms pivotably mounted to a frame, each transport mechanism being configured to pick up the crop material of a windrow from the ground at an entrance position, convey the crop material in a rearward direction, convey the crop material through an arcuate path with the arcuate paths of each extending toward one another and deposit the conveyed crop material from an elevated exit position onto the ground in an inverted condition, each of the transport mechanisms being pivotable between a raised non-operating position and a lowered operating position, said method comprising the steps of:
   providing an arcuate path for said conveying step, wherein said path defines between an entry end and an exit end an arc of between 90 and 130 degrees;
   during inverting,
      moving the apparatus along two generally parallel windrows with the left transport mechanism being in the lowered operating position and the right transport mechanism in a raised position to move and invert a first of the windrows operated upon by the left transport mechanism until the apparatus reaches the end of the windrows;
      turning the apparatus around so that the right transport mechanism is in position to operate on the other of the two windrows, being adjacent to the first windrow;
      lowering the right transport mechanism and raising the left transport mechanism before engaging the other of the two windrows;
      moving the apparatus along the other windrow to move and invert the other windrow;
   during combining,
      moving the apparatus along two generally parallel windrows with the left and right transport mechanisms being in the lowered operating position to move and combine the two windrows into a single larger windrow;
      said inversion and combining steps being performed so that an integrity of the windrows is preserved as the windrows are inverted and combined.

16. A method as defined in claim 15 wherein the arc is about 120 degrees.

17. A method as defined in claim 15 wherein said apparatus is configured to be pulled by the vehicle, and the apparatus is configured to control the speed of operation of the left and right transport mechanisms to convey the crop material in a rearward direction to correspond to the speed of the vehicle.

18. Apparatus for selectively inverting one or more windrows of crop material on the ground as said apparatus is moved in a forward direction through a field, each of the windrows having a lower surface and a generally defined width, said apparatus comprising:
   a frame for attachment to a vehicle;
   a first hydraulically driven transport mechanism for positively picking up the crop material of a windrow from the ground at an entrance position, positively moving the crop material in a rearward direction, positively turning the crop material through a first arc at least greater than 90 degrees, and depositing said turned crop material from an elevated exit position onto the ground in an inverted condition, said first transport mechanism being mounted to said frame and being movable during operation in the field between a raised non-crop material engaging position and a lowered crop material engaging position and comprising a first movable closed conveyor belt mounted on rotatable shafts at opposite ends, said first belt having said entrance position at a forward reach thereof and extending upwardly and rearwardly to said exit position, and a second movable closed conveyor belt mounted on rotatable shafts at opposite ends thereof, said second belt having an arcuate path with an entrance position adjacent said first belt exit position and an exit position corresponding to said elevated exit position;
   a second hydraulically driven transport mechanism for picking up the crop material of a windrow from the ground at an entrance position, positively moving the crop material in a rearward direction, positively turning the crop material through a first arc at least greater than 90 degrees, and depositing said turned crop material from an elevated exit position onto the ground in an inverted condition, said second transport mechanism being mounted to said frame and being movable during operation in the field between a raised non-crop material engaging position and a lowered crop material engaging position, and comprising a first movable closed conveyor belt mounted on rotatable shafts at opposite ends, said first belt having said entrance position at a forward reach thereof and extending upwardly and rearwardly to said exit position, and a second movable closed conveyor belt mounted on rotatable shafts at opposite ends thereof, said second belt having an arcuate path with an entrance position adjacent said first belt exit position and an exit position corresponding to said elevated exit position;

a hydraulic control system configured to be connected to a hydraulic power source for selectively moving said first and second transport mechanisms between said raised and lowered positions and for selectively operating each of said first and second transport mechanisms to perform said picking up, moving, turning and depositing of the crop material when in said lowered position; and said control system connected to a pair of hydraulic cylinders, each said cylinder configured for controlling a corresponding one of said transport mechanisms, said cylinders mounted to said frame below said transport mechanisms for accommodating movement of said transport mechanisms between said raised position and said lowered position.

19. The mechanism of claim 18 wherein said frame has upper and lower horizontal members, and said cylinders are mounted between said members.

20. The mechanism of claim 18 wherein said apparatus includes an entrance end oriented generally horizontally in said lowered position, and generally vertically in said raised position.

* * * * *